United States Patent
Chi et al.

(10) Patent No.: US 10,747,504 B2
(45) Date of Patent: Aug. 18, 2020

(54) CONTEXT-BASED VIEW SERVICE

(71) Applicant: General Electric Company, Schenectady, NY (US)

(72) Inventors: Clement Chi, San Ramon, CA (US); Lauren Renee Bridge, San Ramon, CA (US); Carlos Hernandez, San Ramon, CA (US); Josh Lindsay, San Ramon, CA (US)

(73) Assignee: General Electric Company, Schenectady, NY (US)

( * ) Notice: Subject to any disclaimer, the term of this patent is extended or adjusted under 35 U.S.C. 154(b) by 458 days.

(21) Appl. No.: 15/364,226

(22) Filed: Nov. 29, 2016

(65) Prior Publication Data

US 2017/0220641 A1 Aug. 3, 2017

Related U.S. Application Data

(60) Provisional application No. 62/289,835, filed on Feb. 1, 2016.

(51) Int. Cl.
| | | |
|---|---|---|
| *G06F 8/00* | (2018.01) | |
| *G06F 9/451* | (2018.01) | |
| *G06F 8/36* | (2018.01) | |
| *G06F 8/38* | (2018.01) | |
| *G06F 16/25* | (2019.01) | |

(52) U.S. Cl.
CPC ............ *G06F 8/00* (2013.01); *G06F 8/36* (2013.01); *G06F 8/38* (2013.01); *G06F 9/451* (2018.02); *G06F 16/252* (2019.01)

(58) Field of Classification Search
CPC ..... G06F 8/00; G06F 8/36; G06F 8/38; G06F 9/451; G06F 16/252
See application file for complete search history.

(56) References Cited

U.S. PATENT DOCUMENTS

| | | | |
|---|---|---|---|
| 2010/0058326 A1* | 3/2010 | Dei | G06F 8/61 717/174 |
| 2010/0257196 A1* | 10/2010 | Waters | G06F 3/0481 707/769 |
| 2012/0197911 A1* | 8/2012 | Banka | H04L 67/12 707/752 |
| 2012/0290959 A1* | 11/2012 | Quine | G06F 8/34 715/765 |
| 2016/0026837 A1* | 1/2016 | Good | G06Q 10/087 340/539.13 |
| 2016/0048709 A1* | 2/2016 | Butler | H04L 67/1097 340/10.51 |
| 2016/0226732 A1* | 8/2016 | Kim | H04L 12/2807 |
| 2016/0277530 A1* | 9/2016 | Jung | H04W 4/70 |
| 2016/0306502 A1* | 10/2016 | Ramadge | G06F 9/451 |
| 2017/0060562 A1* | 3/2017 | Lopez | G06F 8/60 |
| 2017/0116618 A1* | 4/2017 | George | G06Q 30/0201 |

* cited by examiner

*Primary Examiner* — Matthew J Ellis
(74) *Attorney, Agent, or Firm* — Buckley, Maschoff & Talwalkar LLC

(57) ABSTRACT

Methods, systems, computer program products, and articles of manufacture for performing a query are described. Context information for formulating a query is obtained. The query is performed to identify a first card based on the context information, the query being performed by comparing the context information and an attribute of the first card, the attribute defining context of the first card. The identification of the first card that satisfies the query is provided.

15 Claims, 13 Drawing Sheets

San Ramon Temperature  ──────────  Temperature: 81° F  350  ──────────

Walnut Creek Temperature  ──────────  Temperature: 80° F  354  ──────────

*FIG. 3B*

CONTEXT-BASED VIEW SERVICE

CLAIM OF PRIORITY

This application is a continuation of and claims the benefit of priority under 35 U.S.C. § 119(e) to U.S. Patent Application Ser. No. 62/289,835, filed on Feb. 1, 2016, which is hereby incorporated by reference herein in its entirety.

TECHNICAL FIELD

This application relates generally to view services. More particularly, this application relates to a context-based view service.

BACKGROUND

The traditional Internet of Things (IoT) involves the connection of various consumer devices, such as coffee pots and alarm clocks, to the Internet to allow for various levels of control and automation of those devices. The Industrial Internet of Things (IIoT), on the other hand, involves connecting industrial assets. There are technical challenges involved in interconnecting diverse industrial assets, such as wind turbines, jet engines, and locomotives, that simply do not exist in the realm of consumer devices.

BRIEF DESCRIPTION OF DRAWINGS

The present disclosure is illustrated by way of example and not limitation in the figures of the accompanying drawings, in which like references indicate similar elements and in which:

FIG. 3B illustrates two example user interface elements corresponding to two cards, in accordance with an example embodiment.

DETAILED DESCRIPTION

The description that follows includes illustrative systems, methods, techniques, instruction sequences, and machine-readable media (e.g., computing machine program products) that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

Some of the technical challenges involved in an IIoT include items such as predictive maintenance, where industrial assets can be serviced prior to problems developing in order to reduce unplanned downtimes. As such, one such technical challenge involves prediction of when industrial assets or parts thereon will fail. In an example embodiment, an IIoT may be designed that monitors data collected from sensors and, using physics-based analytics, detects potential error conditions based on an asset model. The asset in question can then be gracefully shut down for maintenance at the appropriate time. In addition to these types of edge applications (applications involving the industrial assets directly), the IIoT may also pass the sensor data to a cloud environment where operational data for all similar machines under management can be stored and analyzed. Over time, data scientists can discover new patterns and create new and improved physics-based analytical models. The new analytical model can then be pushed back to all of the assets, effectively improving the performance of all assets simultaneously.

Figure 1:
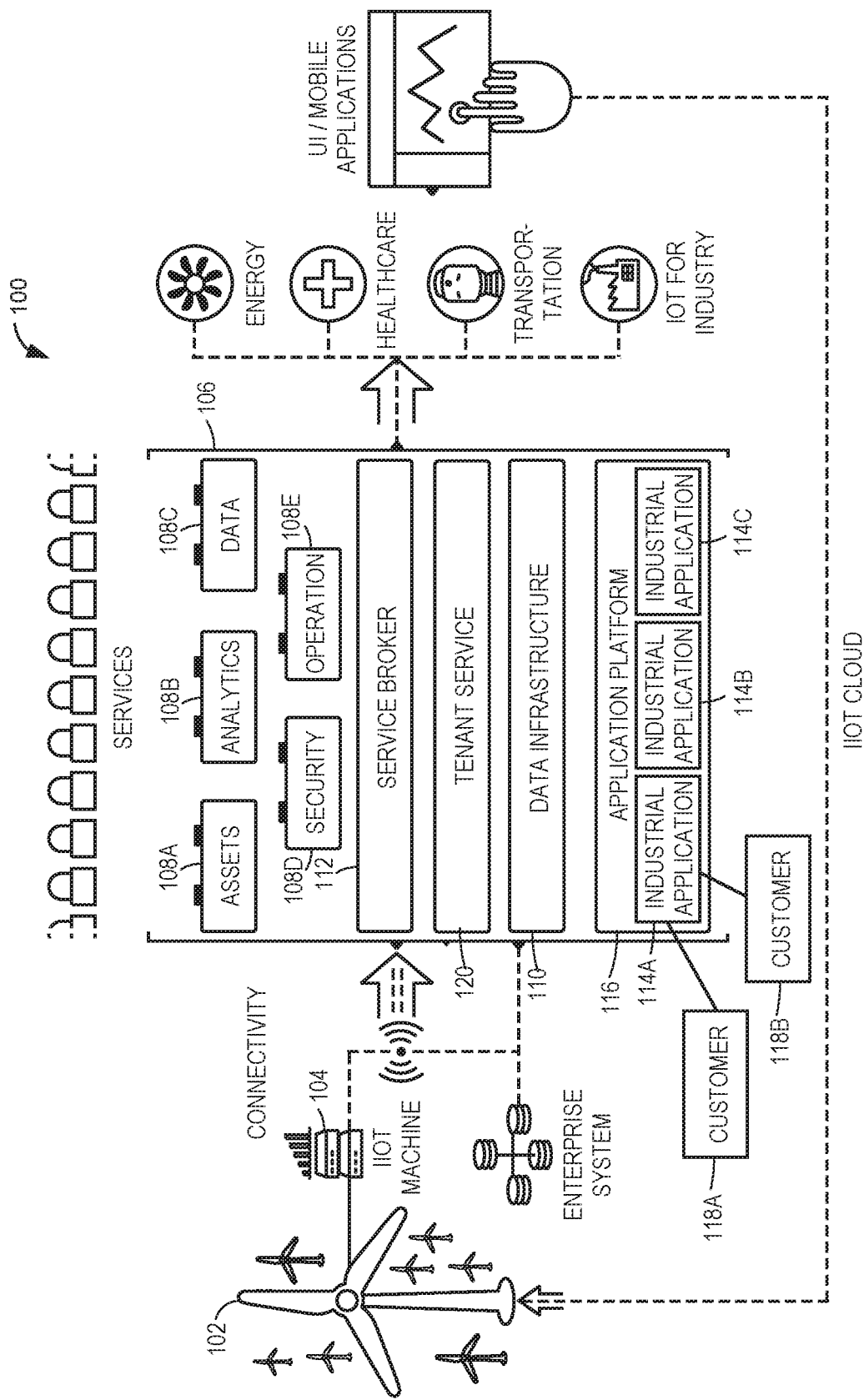
FIG. 1 is a block diagram illustrating a system, in accordance with an example embodiment, implementing an IIoT.

FIG. 1 is a block diagram illustrating a system 100, in accordance with an example embodiment, implementing an IIoT. An industrial asset 102, such as a wind turbine as depicted here, may be directly connected to an IIoT machine 104. The IIoT machine 104 is a software stack that can be embedded into hardware devices such as industrial control systems or network gateways. The software stack may include its own software development kit (SDK). The SDK includes functions that enable developers to leverage the core features described below.

One responsibility of the IIoT machine 104 is to provide secure, bidirectional cloud connectivity to, and management of, assets 102, while also enabling applications (such as analytical and operational services) at the edge of the IIoT. The latter permits the delivery of near-real-time processing in controlled environments. Thus, the IIoT machine 104 connects to an IIoT cloud 106, which includes various modules, including asset module 108A, analytics module 108B, data module 108C, security module 108D, and operations module 108E, as well as data infrastructure 110. This allows other computing devices, such as client computers, running user interfaces/mobile applications to perform various analyses of either the individual industrial asset 102 or assets of the same type.

The IIoT machine 104 also provides security, authentication, and governance services for endpoint devices. This allows security profiles to be audited and managed centrally across devices, ensuring that assets 102 are connected, controlled, and managed in a safe and secure manner, and that critical data is protected.

Figure 2:
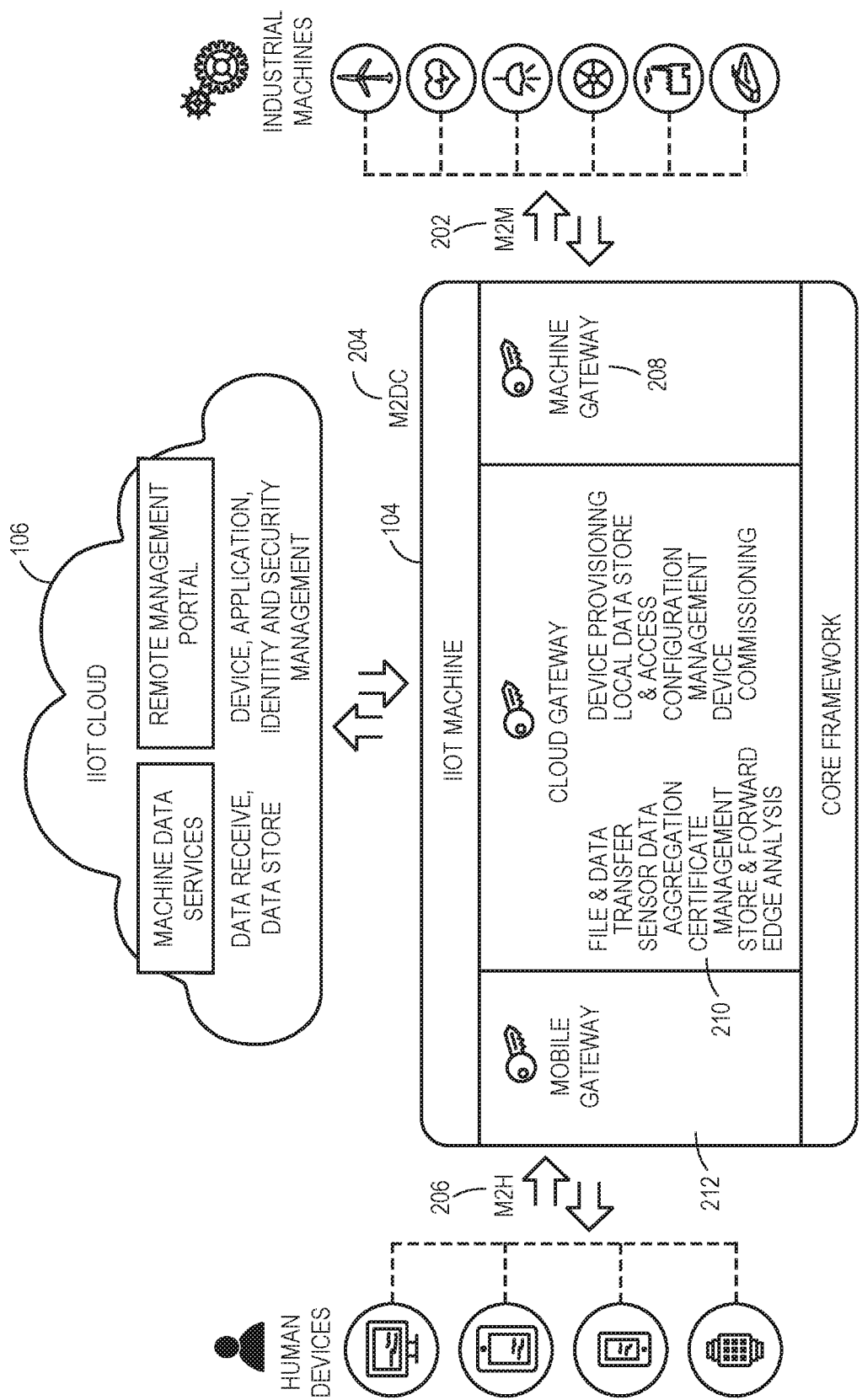
FIG. 2 is a block diagram illustrating different edge connectivity options that an IIoT machine provides, in accordance with an example embodiment.

In order to meet requirements for industrial connectivity, the IIoT machine 104 can support gateway solutions that connect multiple edge components via various industry standard protocols. FIG. 2 is a block diagram illustrating different edge connectivity options that an IIoT machine 104 provides, in accordance with an example embodiment. There are generally three types of edge connectivity options that an IIoT machine 104 provides: machine gateway (M2M) 202, cloud gateway (M2DC) 204, and mobile gateway (M2H) 206.

Many assets 102 may already support connectivity through industrial protocols such as Open Platform Communication (OPC)-UA or ModBus. A machine gateway component 208 may provide an extensible plug-in framework that enables connectivity to assets 102 via M2M 202 based on these common industrial protocols.

A cloud gateway component 210 connects an IIoT machine 104 to an IIoT cloud 106 via M2DC.

A mobile gateway component 212 enables people to bypass the IIoT cloud 106 and establish a direct connection to an asset 102. This may be especially important for maintenance scenarios. When service technicians are deployed to maintain or repair machines, they can connect directly from their machine to understand the asset 102's operating conditions and perform troubleshooting. In certain industrial environments, where connectivity can be challenging, the ability to bypass the cloud and create this direct connection to the asset 102 may be critical.

As described briefly above, there are a series of core capabilities provided by the IIoT system 100. Industrial scale data, which can be massive and is often generated continuously, cannot always be efficiently transferred to the cloud for processing, unlike data from consumer devices. Edge analytics provide a way to preprocess the data so that only the pertinent information is sent to the cloud. Various core capabilities provided include file and data transfer, store and forward, local data store and access, sensor data aggregation, edge analytics, certificate management, device provisioning, device decommissioning, and configuration management.

As described briefly above, the IIoT machine 104 can be deployed in various different ways. These include on the gateway, on controllers, or on sensor nodes. The gateway acts as a smart conduit between the IIoT cloud 106 and the asset(s) 102. The IIoT machine 104 may be deployed on the gateway device to provide connectivity to asset(s) 102 via a variety of protocols.

The IIoT machine 104 can be deployed directly onto machine controller units. This decouples the machine software from the machine hardware, allowing connectivity, upgradability, cross-compatibility, remote access, and remote control. It also enables industrial and commercial assets that have traditionally operated standalone or in very isolated networks to be connected directly to the IIoT cloud 106 for data collection and live analytics.

The IIoT machine 104 can be deployed on sensor nodes. In this scenario, the intelligence lives in the IIoT cloud 106 and simple, low-cost sensors can be deployed on or near the asset(s) 102. The sensors collect machine and environmental data and then backhaul this data to the IIoT cloud 106 (directly or through an IIoT gateway), where it is stored, analyzed, and visualized.

Customers or other users may create applications to operate in the IIoT cloud 106. While the applications reside in the IIoT cloud 106, they may rely partially on the local IIoT machines 104 to provide the capabilities to gather sensor data, process it locally, and then push it to the IIoT cloud 106.

The IIoT cloud 106 enables the IIoT by providing a scalable cloud infrastructure that serves as a basis for platform-as-a-service (PaaS), which is what developers use to create Industrial Internet applications for use in the IIoT cloud 106.

Referring back to FIG. 1, services provided by the IIoT cloud 106 and generally available to applications designed by developers include asset services from asset module 108A, analytics services from analytics module 108B, data services from data module 108C, application security services from security module 108D, and operational services from operations module 108E.

Asset services include services to create, import, and organize asset models and their associated business rules. Data services include services to ingest, clean, merge, and ultimately store data in the appropriate storage technology so that it can be made available to applications in the manner most suitable to their use case.

Analytics services include services to create, catalog, and orchestrate analytics that will serve as the basis for applications to create insights about industrial assets 102. Application security services include services to meet end-to-end security requirements, including those related to authentication and authorization.

Operational services enable application developers to manage the lifecycle and commercialization of their applications. Operational services may include development operational services, which are services to develop and deploy Industrial Internet applications in the cloud, as well as business operational services, which are services that enable transparency into the usage of Industrial Internet applications so that developers can ensure profitability.

The application security services provided by the security module 108D include user account and authentication (UAA) and access control. The UAA service provides a mechanism for applications to authenticate users by setting up a UAA zone. An application developer can bind the application to the UAA service and then use services such as basic login and logout support for the application, without needing to recode these services for each application. Access control may be provided as a policy-drive authorization service that enables applications to create access restrictions to resources based on a number of criteria.

Thus, a situation arises where application developers wishing to create industrial applications for use in the IIoT may wish to use common services that many such industrial applications may use, such as a log-in page, time series management, data storage, and the like. The way a developer can utilize such services is by instantiating instances of the services and then having their applications consume those instances. Typically, many services may be so instantiated.

There is a desire among developers to develop applications that are capable of being multi-tenant. Multi-tenant applications allow for different customers of the application to "share" the application (in the cloud), while having their respective data kept private from each other (called "isolation"). Thus, in such circumstances, an application developer may need to instantiate different instances of each service used by the application for the different customers. Thus, if an application is designed to consume four IIoT cloud services, and the application has two different customers, the application developer must eventually instantiate eight different instances. This can be very time consuming and resource intensive. Each instance must be instantiated and then bound to the application. Additionally, once the bindings are complete, the application needs to be restarted. Thus, if a new tenant/customer is added to an application, the application developer not only needs to instantiate four new instances for the services and bind them to the application, but also restart the application for all tenants to ensure that the changes take effect.

The asset model may be the centerpiece of many, if not all, Industrial Internet applications. While assets 102 are the instantiations of asset types (types of industrial equipment, such as turbines), the asset model is a digital representation of the asset's structure. In an example embodiment, the asset service provides application program interfaces (APIs), such as representational state transfer (REST) APIs that enable application developers to create and store asset models that define asset properties, as well as relationships between assets 102 and other modeling elements. Application developers can then leverage the service to store asset-instance data. For example, an application developer can create an asset model that describes the logical component structure of all turbines in a wind farm and then create instances of that model to represent each individual turbine. Developers can also create custom modeling objects to meet their own unique domain needs.

In an example embodiment, the asset module 108A may include an application program interface (API) layer, a query engine, and a graph database. The API layer acts to translate data for storage and query in the graph database. The query engine enables developers to use a standardized language, such as Graph Expression Language (GEL), to retrieve data about any object or property of any object in the asset service data store. The graph database stores the data.

An asset model represents the information that application developers store about assets 102, how assets 102 are organized, and how they are related. Application developers can use the asset module 108A APIs to define a consistent asset model and a hierarchical structure for the data. Each piece of physical equipment may then be represented by an asset instance. Assets 102 can be organized by classification and by any number of custom modeling objects. For example, an organization can use a location object to store data about where its pumps are manufactured, and then use a manufacturer object to store data about specific pump suppliers. It can also use several classifications of pumps to define pump types, assign multiple attributes, such as Brass or Steel, to each classification, and associate multiple meters, such as Flow or Pressure, to a classification.

Data services from the data module 108C enable Industrial Internet application developers to bring data into the system and make it available for their applications. This data may be ingested via an ingestion pipeline that allows for the data to be cleansed, merged with data from other data sources, and stored in the appropriate type of data store, whether it be a time series data store for sensor data, a binary large object (BLOB) store for medical images, or a relational database management system (RDBMS).

Since many of the assets 102 are industrial in nature, much of the data that will commonly be brought into the IIoT system 100 for analysis is sensor data from industrial assets 102. In an example embodiment, a time series service may provide a query efficient columnar storage format optimized for time series data. As the continuous stream of information flows from sensors and needs to be analyzed based on the time aspect, the arrival time of each stream can be maintained and indexed in this storage format for faster queries. The time series service also may provide the ability to efficiently ingest massive amounts of data based on extensible data models. The time series service capabilities address operational challenges posed by the volume, velocity, and variety of IIoT data, such as efficient storage of time series data, indexing of data for quick retrieval, high availability, horizontal scalability, and data point precision.

In an example embodiment, a concept of tenant is introduced for the purposes of IIoT implementations. Specifically, each tenant is comprised not just of a customer but also of a bundle of services.

In an example embodiment, the concept of tenant is implemented using templates. These templates can be defined broadly or narrowly. Specifically, there could be one template used for all tenants, or different templates used for different configurations of groups of tenants (e.g., one template for industrial customers, one template for commercial customers, or alternatively grouped by industry, etc.).

Furthermore, the resolution of service instance credentials can be performed at runtime, allowing for alterations in the instantiations/bindings to occur without requiring restarting the application.

Referring back to FIG. 1, the instantiations and bindings may be performed using a service broker 112. Applications 114A-114C, which are created by a developer and run on the cloud, may be hosted by application platform 116.

Customers 118A-118B may then interact with applications 114A-114C to which they have subscribed. Here, for illustrative purposes, customers 118A and 118B are both tenants of application 114A. A tenant service 120 may be used to manage tenant-related modifications, such as management of templates and creation of tenants.

View Service

In one example embodiment, a view service is an application 114 that enables access to and display of information, such as data related to the monitoring of assets 102. The view service provides persistence for the state of card and deck objects, described more fully below by way of example, and enables the retrieval of card and deck objects using APIs of the view service. The view service may be used to create a web application to, for example, display data obtained while monitoring various assets 102, such as industrial wind turbines. The web application may access an API of the view service to access information contained in the card and deck objects, as described more fully below. In addition, the view service is context-aware and context-adaptive and is able to adapt the display of sensitive information dependent on security clearance and escalation levels, roles, permissions, and other security-related attributes.

Example Cards

Figure 3A:
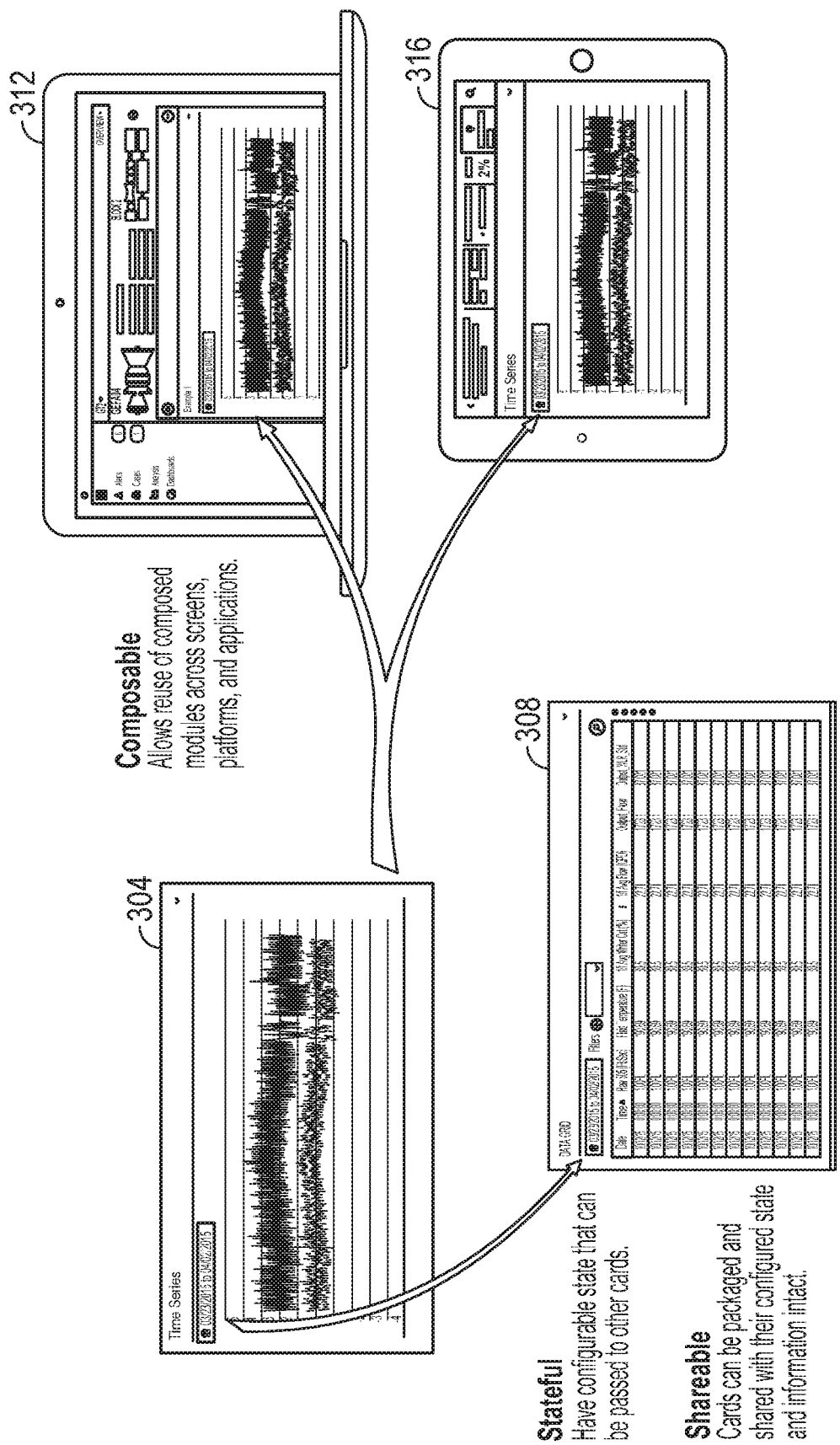
FIG. 3A illustrates example features of a card, in accordance with an example embodiment.

FIG. 3A illustrates example features of a card, in accordance with an example embodiment. A card is a composable, interactive user interface module that may be displayed on a laptop computer 312, a tablet computer 316, and the like. In one example embodiment, a card has a corresponding state and can be shared across different environments. A card may correspond to, for example, sensor data obtained from an asset, such as a wind turbine, or a post on a social network website. The information of a card may be viewed as a chart 304 to reveal the time series nature of the data, as a data grid 308 to reveal the details of the data, and the like. In one example embodiment, a card may be implemented, for example, as a Polymer virtual component.

A card may act as a container for data that corresponds to a defined content area of a display screen. A card can contain embedded data (such as sensor data) and, in some cases, can provide the embedded data even when network connectivity is limited or unavailable. A card can store data into or retrieve data from an external data source using an API of the card. Cards may be hidden or exposed, as needed. In one example embodiment, the data of a card is stored in a row of a database table. In one example embodiment, cards may be indexed based on context, as described more fully below. Cards may reside in a database of a defined view.

A card can receive and transmit events, and is both aware of and reactive to the context in which it resides. Context may be defined, for example, as an attribute of the card. A card allows interactions between components within an individual card, and interactions with other cards. A card can have its complete state saved using an API of the view service, as described more fully below.

An example card table for storing data of a card is illustrated below. The card table may contain data for a single card, or may contain data for a plurality of cards. As shown, the table contains an identification column that contains a unique identifier for the card, a tenant identifier column that contains a multi-tenancy partition key for the card, a title column that contains a title for the card, a slug column that contains a name of the component corresponding to the card, and an attributes column that contains one or more attributes of the card. The attributes may include, for example, contextual data, such as a postal zip code that is used to indicate a particular location, the state of the card, and the like.

| Column | Description |
| --- | --- |
| identifier | Unique card identifier |
| tenantId | Multi-tenancy partition key |
| title | Card title |
| slug | Component element name |
| attributes | Component attribute |

Example of Creating a Card

A card comprises a composable user interface object. A card can be cloned or forked from a sample card or can be built from scratch. An instance of a card can be generated from a card template and may be stored in a database of a view service. Cards may be configured as follows using JavaScript Object Notation (JSON):

```
<!-- a card that can display temperature of a city -->
<my-temperature-card id="card-1" title="San Ramon
Temperature"postal="94582" unit="F"></my-temperature-
card>
/*
Create Card in view service
[POST] /v1/Cards
Request Body:
*/
[{
    "title": "San Ramon Temperature",
    "slug": "my-temperature-card",
    "attributes": {
        "postal": "94582",
        "unit": "F"
        }
},
{
    "title": "Walnut Creek Temperature",
    "slug": "my-temperature-card",
    "attributes": {
        "postal": "94595",
        "unit": "F"
        }
}
```

FIG. 3B illustrates two example user interface elements 350, 354 corresponding to two cards, in accordance with an example embodiment. The user interface elements 350, 354 are based on the cards defined above using JavaScript Object Notation. The first user interface element 350 displays the temperature in the city of San Ramon and the second user interface element 354 displays the temperature in the town of Walnut Creek.

Example Decks

A deck is a container for a collection of cards to create more intricate user interactions. Decks have a specified layout that determines the arrangement of the cards in the deck, such as a specific order of cards. A deck can have its complete state saved using an API of a view service. Saving a card within a deck may call the same function that is used to save the state of a card.

Decks may be viewed, modified, and deleted. These actions are controlled by the access-control rules associated with the UAA services. Access to these objects, such as the cards and decks, can be configured according to user, role, or group.

A deck of cards can be defined using, for example, the deck table shown below. A deck table may contain data for a single deck, or may contain data for a plurality of decks. As shown, the deck table contains an identifier column that contains a unique identifier for the deck, a tenant identifier column that contains a multi-tenancy partition key for the deck, a title column that contains a title for the deck, a slug column that contains a name of the component corresponding to the deck, an attributes column that contains one or more attributes of the deck, and a card order column that comprises a definition of the order of the cards in the deck. The attributes may include, for example, contextual data (such as a postal zip code that indicates a location), the state of the card, and the like.

| Column | Description |
| --- | --- |
| identifier | Unique deck identifier |
| tenantId | Multi-tenancy partition key |
| title | Card title |
| slug | Component element name |
| Attributes | Component attribute |
| cardOrder | Order of cards |

Example of Creating a Deck

A deck is a container that identifies a layout of cards. A deck may be configured as follows (using JavaScript Object Notation):

```
<!-- a deck with 2 cards -->
<px-deck id="deck-1">
<my-temperature-card id="card-1" title="San Ramon
Temperature" postal="94582" unit="F"></my-temperature-
card>
<my-temperature-card id="card-3" title="Walnut Creek
Temperature" postal="94595" unit="F"></my-temperature-
card>
</px-deck>
```

A deck instance can be retrieved from, for example, a database (using JSON format):

```
/*
Create deck in view service
[POST] /api/decks
Request Body:
*/
```

-continued

```
{
    "title": "Contra Costa Deck"
}
```

Example of Associating a Card with a Deck

A card may be associated with one or more decks. The example card-to-deck table below illustrates the association of a card with a deck. A card-to-deck table may contain data for a single association, or may contain data for a plurality of associations. As shown, the card-to-deck table contains an identifier column that contains a unique association identifier, a card identifier column that contains an identifier for the corresponding card, and a deck identifier column that contains an identifier of the deck that contains the corresponding card.

| Column | Description |
| --- | --- |
| identifier | Unique association identifier |
| cardId | Card identifier |
| deckId | Deck identifier |

In one example embodiment, one or more cards may be associated with a deck. For example, using JavaScript Object Notation:

```
Associate Card 1,2 to Deck 1
[POST] /api/decks/1/cards/add
Request body
*/
["1", "2"]
```

Cards in a deck instance may be retrieved from the view service database. For example, using JavaScript Object Notation:

```
/*
Get all cards in deck 1
[GET] /api/decks/1/cards
Response Body:
*/
[
    {
        "id": 1,
        "title": "San Ramon Temperature",
        "slug": "my-temperature-card",
        "attributes": {
            "postal": "94582,
            "unit": "F"
        }
    },
    {
        "id": 2,
        "title": "Walnut Creek Temperature",
        "slug": "my-temperature-card",
        "attributes": {
            "postal": "94595,
            "unit": "F"
        }
    }
]
```

Example Tags

In one example embodiment, cards, decks, or both can be tagged; the tags can be used to identify cards or decks based on, for example, contextual information. In addition, cards, decks, or both can be searched for based on an identifier, a name, a tag, context information (including attributes of a card, attributes of a deck, a tag, and a context object), and the like.

A tag for a card or deck may be defined using, for example, the tag table shown below. A tag table may contain data for a single tag, or may contain data for a plurality of tags. As shown, the tag table contains an identifier column that contains a unique identifier for the tag, a tenant identifier column that contains a multi-tenancy partition key for the deck, a tag owner identifier column that contains an identifier for the corresponding card or deck, a type column that indicates the type of component (e.g., card or deck) that the tag is associated with, and a value column that contains, for example, a tagged character string.

| Column | Description |
| --- | --- |
| identifier | Unique tag identifier |
| tenantId | Multi-tenancy partition key |
| tagOwnerId | Card identifier/Deck identifier |
| type | Card/Deck |
| value | String of the tag/category name |

Example of Tagging a Deck

A card or deck can be tagged to, for example, enable a look up of the card or deck in the view service database by, for example, a category. For example, a tag can be defined for a deck using JavaScript Object Notation:

```
/*
Tag a deck by multiple tag values
[POST] /api/decks/1/tags
Request Body:
*/
[
    {"value": "contra costa"},
    {"value": "california"},
    {"value": "us"}
]
```

A deck may also be looked up by a tag using JavaScript Object Notation:

```
Get a deck by tag/category lookup
[GET] /api/decks/tags?values=us
Response Body:
*/
[
    {
        "id": 1,
        "title": "Contra Costa Deck"
        "tags": [
            {"value": "contra costa"},
            {"value": "california"},
            {"value": "us"}
        ]
    }
]
```

Figure 4A:
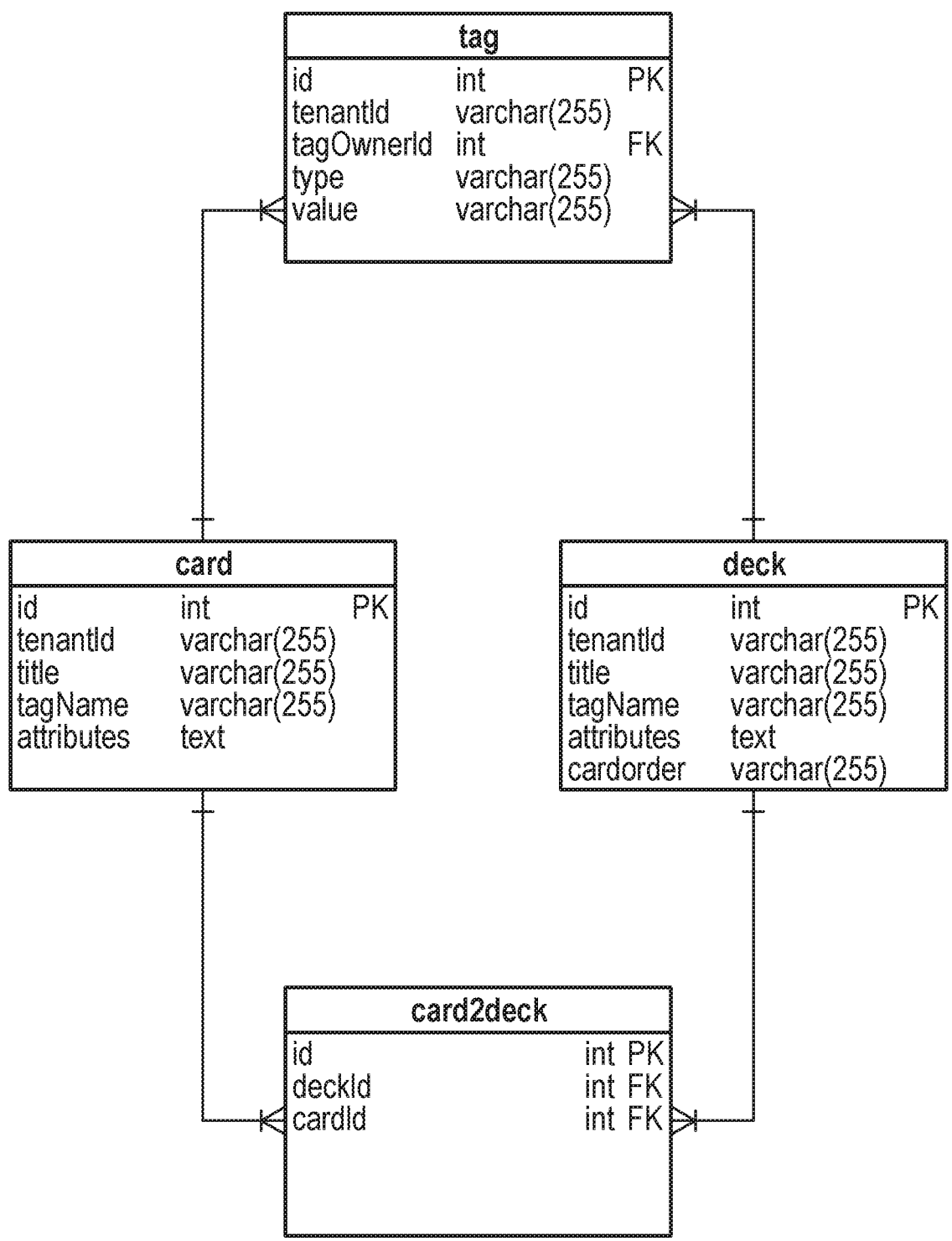
FIG. 4A illustrates the relationship between card, deck, tag, and card-to-deck objects, in accordance with an example embodiment.

FIG. 4A illustrates the relationship between card, deck, tag, and card-to-deck objects, in accordance with an example embodiment. A card or deck may have one or more associated tags. In addition, a card-to-deck association may associate a card with one or more decks.

Example Context

Context is the environment and manner in which an object, asset, or system is being used by the user, by other parts of the system, or both. Context defines the scope of the information to be passed through to views, cards, and widgets for display. Context is represented by its own current state and the state of the system around it, and can take into account intention and history. An object or entity can have context, be part of context, or be context itself. In one example embodiment, a use case for defined context is a particular asset or group of assets that are to be provided by the asset service.

Context may be defined by an attribute of a card, an attribute of a deck, a tag, a context object, and the like. For example, an attribute of a card may be a postal zip code that indicates a particular location; the postal zip code thereby gives context to the card. The following is an example of a context object:

```
{
    "user": {
        "name": "clement",
        "id": "123"
    },
    "time": "1231231123",
    "device": {
        "id": "123",
        "name": "test"
    },
    "role": ["admin"],
    "datasource": {
        "sensor1":
        "http://cp.mcafee.com/d/avndy0Q96Qm7S6n6663hOrKrhKO
        UCZtZcQsCQrIK9Lnv7c6QrIK9LnvpKrhKNt5cQsLK3zoy8X24Lf
        fG2G7C9bsKrEuoAJOVJ5cswXHz__nV5wQszDHKetuVt4QsKfsCqe
        hOr5Sk-
        EyCJtdmXPDaxVZicHs3jq9J5wTsTsSjDdqympF2TbVjUkH6C8Cy
        8ToD854vVsSYeKOr1vF6y0nB6APh0x7npCy2HFEwoKqehTn76zA
        9z29EwmzkPaAGMQYQgbrfUjd46Hb7OJIVlwrshdIU1gabtL,
        "sensor2":
        "http://cp.mcafee.com/d/1jWVIq4zqb3X3bz331EVdTdETps
        juK-
        CqejqdSn4THLzC3qdSn4THLITdEToKyCqenT1NIh4tx2nDDR1l3
        P4BKndQfcimVsSyCegtRN__HYyMqehPRT7eLsKyqen7Kjd78VdyX
        avkhjmKCHtVPBgY-
        F6lK1FJcSyMrKrKr9PCJhbcQxrBYFYalzj4Ph4rIjA2yfYKru7n
        pdwLQzh0bOzipEwgzHIPh1lQQgcnd78XHzzhO4Nx4QgbhGpBilo
        quq85JDY9Cy3lBzVmSsGMdK8COTHgB1Cg,
        "sensor3":
        "http://cp.mcafee.com/d/2DRPoAd2hJ5xZxBNxxwQsCXCQrI
        K9Lnvjd79J6XbyrRTNP1J6XbyrRTSrCQrInhjd7bXwUS8yeMxbP
        PWwGxVyiTbCW7C9bsKrhj78eWU__R-
        hod78VWXzDnKnhd7bzT9CzAsCNtBfG8FHnjlKYVOEuvkzaT0QSO
        rhodTdTdAVPmEBCqgJO-k-5aNFz9EydS9O1h7-
        ndL3HICMnWhEw5VhFcQg8hRSpEwGWq86bCzAtRNNEV2oMyq85ER
        cOFaIdfd42SP-4Ph1GONYHrelo6T4jvFV8,
        "sensor4":
        "http://cp.mcafee.com/d/1jWVIqdEIfIcKccc6zATsSztBNd
        WXWpEVdETpsjuK-eodETpsjuK-
        PsSztyWapEVvs76N4hS49uuvk5kfcimVsTgYN9rBPqaoV1Tn7-
        LOb1EV7fnssWZOW9EVsuVcQszASbIFZh5dqWqJTDel3PWApmU6C
        S3qb1KVKVIDeqR4IPi5KnODMFmdcod4hKNega8__OVJUttAS2__id
        40Lad9Cy12eKPd45njh0NsQszKKed78j64jh0J6FCl9lxFVEwmS
        vMCq8dmmfBrpOH0SUyr9Pno
    },
    "location": {
        "country": "US",
        "county": "contra costa",
        "city": "san ramon",
        "postal": "94582",
        "coordinates": [123123, 12321312]
    },
    "locale": "en-us"
}
```

A context-aware dashboard (or contextual dashboard) that allows a user to view data, such as data gathered from a sensor monitoring an asset 102, behaves and looks differently depending on, for example, the following factors:
 User or persona
 Base object (which may be represented by the dashboard or on which the dashboard may be acting)
 Time (such as weekday, day, night, year, and the like)
 Device
 Roles and privileges
 User group
 State of the system, device, user, and the like
 Personal preferences
 Sensory factors
 Environment
 Language
 Locale
 Writing system (such as phonetic, alphabetic, pictographic, ideographic, and the like)
Example of Querying Data with Filters A query is a read operation on the view service database that returns a result set in, for example, JSON format. Filters specify the criteria for the result set. A query can be based on, for example, context, as defined above. For example, a query can specify context, such as a postal zip code. A context-based search can search attributes of a card, attributes of a deck, tags, context objects, or any combination thereof for elements that match the specified context. A filter can be specified with an API of the view service using the following format:

?filter[<filterType>]=[<filter inputs>]

The following table provides example filters:

| Filter Type | Description | Example |
|---|---|---|
| include | Allow related data models to be included in the result set | /decks?filter[include]=cards |
| order | Allow result set to be return in order that is specified | /decks?filter[order]=createTimeStamp DESC |
| | Get a deck with ordered cards | decks?filter[cards] &filter[order]=cards |
| where | Filter the result set by field value | /decks?filter[where][title]=Overview |

Example Components

Components provide the base-level interactions in the system. Components provide presentation, interaction, and behavior capabilities based on the underlying context, data-binding and services. Components adhere at a more granular level to the same overall principles of workflow and data aggregation:

Definition of its dependencies, behavior, styling and template, instantiated using simple HTML syntax (for example, <px-datepicker/>.
Independent releases and versions.
Ability to inherit functionality from other components by either extension or composition using mixing.
Nesting as part of another component, which can exercise its public API.
Ability to expose an API to the outside world, addressed by application frameworks such as Angular. This includes scope bidirectional binding.

| Component Name | Description | Documentation |
|---|---|---|
| px-app-nav | Navigation bar or drawer for applications. | README.md |
| px-card | Component with a standard API that is initialized with a context. See Cards for more information. | README.md |
| px-chart | Element that defines a chart, using sub-elements for axis, series and controls configuration. | README.md |
| px-context-browser | Display multiple levels of hierarchy of the current location. | README.md |
| px-dashboard | Render a deck with a given URL. | README.md |
| px-data-table | Data table with the expected data format is a JSON array. | README.md |
| .px-deck | A collection of cards. See Decks for more information | README.md |
| px-deck-selector | Display a drop-down of decks and returns the URL for the selected deck. | README.md |
| px-popover | Display additional information to a user. | README.md |
| px-rangepicker | Set a range of time using a calendar-based user interface. | README.md |
| px-simple-bar-chart | Visualize a series of numeric values as a bar chart, or multiple series of numeric values as a stacked bar chart. | README.md |
| px-simple-horizontal-bar-chart | Visualize a series of numeric values as a horizontally-oriented bar chart | README.md |
| px-simple-line-chart | Visualize a series of numeric values as a line chart. | README.md |
| px-slider | Define a value in a range or a range of values within set boundaries. | README.md |
| px-spinner | indicate when data is being loaded, a view is changing, or any place a visual indication is needed to show that work is being done for an indefinite period of time. | README.md |

Pre-built components may be provided in a component repository and may be used to create a customized card. Example components include:

Example Widgets

A widget is a special type of component that visualizes data and allows for user interaction with the system. Widgets can be shared and are available in a catalog. Widgets can reside inside or outside of a card and can communicate through the view or card that contains them.

Example User Interface Elements

User interface elements 350, 354 are individual elements of a consistent visual language used to represent items, such as buttons, form fields, drop-downs, other coded patterns, and the like. The design system includes elements for download and use in applications 114.

Example Layouts and Grid System

A deck supplies one-dimensional layout control for cards, i.e. an order of the cards. This control may come from the deck itself. A developer, user, and the like can save the layout state of all cards in a deck. It may not be necessary to supply a grid or flex system to save the layout state. The layout state of any card in the deck can be saved using an API of the view service.

Example View Service

The view service is used to create, retrieve, update, and delete the state and other associated information of the user interface, including view objects and associated data (via, for example, hypertext transfer protocol (HTTP)). A view object is a representation of a UI component definition and state. View objects are a super-classification of a widget, a card, and a view, meaning that a widget, a card, and a view are all classes of view objects. A view object type is a category of view objects particular to a view object class; for example, decks may have types, such as Inbox, Timeline, Dashboard, Case, and the like.

The view service may be deployed on the system platform, to be used in conjunction with other services, and the components. A view service instance is a particular deployed instance of the view service being used by a particular application 114. The view service receives and returns data to and from authorized agents via, for example, an HTTPS API available to applications 114 and other services. The view service provides persistence for data to a data store service. The view service authorizes agents via the UAA service. A view service instance is a particular deployed instance of the view service being used by an application 114.

In one example embodiment, a view is a layout container in which a card(s) resides and may include other UI elements that do not reside in cards. Views, like cards, are shareable between users. A view selector indicates the current view name and is used to open a list of available views for a given asset context. As described more fully above, an asset is a machine, system, service, and the like which the application 114 is monitoring, interacting with, or both.

A view object configuration is the particular configuration information of a view object instance. An example is "Tags" which lists the tag variables to be connected to a time series card. (A time series card, as used herein, is a card containing data that corresponds to a series of points in time.) A view object configuration option is an option made available for configuration of a view object instance. A view object instance state is the particular condition that a view object is in at a specific time. A view object instance is a particular instance of a view object created for use in an application 114. An instance is associated with metadata and is a descendant of a class, references a Template, and has a type, a configuration, and a state.

Agents interacting with the view service may be human users acting via an application 114. In addition, other services acting as agents will generate new view data and configuration information automatically based on an event, such as an alarm system that triggers an automatic card generation procedure. The view service will interact with users via applications 114 and other services based on the configuration.

Example View Service Database Tables

The context of cards and decks can be saved and retrieved using the view service database and the view service APIs. The view service database tables support the following operations:

Create a card
    Create a deck
    Associate a card with a deck
    Tag a deck or card Example Card Component In one example embodiment, a card component (px-card) is a context sensitive web component with a standard API and is built, for example, using the Polymer/Web component technology offered by Google Inc. of Mountain View, Calif. USA. The corresponding card API (px.card) may be used to define the behavior for the corresponding card. The card component facilitates internal widget to widget communication using data binding and external communication using card methods. The card component also has an API that facilitates card-to-card communication of cards within a deck.

Context is an object { } of any format, and can contain asset information, asset URL, user role, or virtually any developer defined property. Context can be set from an asset browser and can be sent to components, such as px-dashboard/px-deck. Context can be passed from components, such as px-dashboard/px-deck, into a card component.

A card can be implemented using the following code:

```
<--sample card implementation-->
<link rel="import" href="../polymer/polymer.html"/>
<link rel="import" href="../px-card/px-card.html"/>
<!--
```

Steps for creating a card:
1. Create a Polymer web component.
2. Wrap the Polymer web component in px-card.
3. Use the px.card
4. Compose widgets and ui-elements together to create the custom card. Implement custom methods and use px card API methods like getData, updateDeck, showCard, hideCard. Wrap the card in a px-deck. (views/sample-cards.html) Optionally, a card may be wrapped in a px-dashboard. (views/dashboard.html & controllers/dashboard.js)

```
-->
<dom-module id="demo-card">
<template>
<px-card icon="fa-suitcase" header-text="Demo Card">
<h4>Hello World</h4>
<p>{{context.name}}</p>
</px-card>
</template>
</dom-module>
<script>
Polymer({
    is: 'demo-card',
    init: function( ){
        // on initialization callback
        // this is where some initialization of a card can be performed,
        this.context can be accessed here
    },
    contextChanged: function(newContext, oldContext){
        // on context change callback
        // this is where you will receive updates to the context
    },
    deckStateChanged: function(newDeckState, oldDeckState){
        // on deck state change callback
        // this is where you will receive updates from other cards
    },
    myCardMethod1: function( ){
        var self = this;
        //card API to
        this.getData(this.context.url).then(function(data){
            self.data = data;
        });
    },
    myCardMethod2: function(time){
        this.updateDeck({selectedTime: time});
        //card API to publish object into other cards within the deck
    },
    myCardMethod3: function( ){
        this.hideCard( ); //card API to hide this card on deck
    },
    myCardMethod3: function( ){
        this.showCard( ); //card API to show this card on deck
    },
    behaviors: [px.card] //card API is injected here
});
```

A deck component (px-deck) is a collection of cards that enables card to card communication through a deck state object. A dashboard component (px-dashboard) is a deck renderer that can render a deck of cards using, for example, a deck URL. An object in window namespace (e.g., px.dealer) provides a bridge between a card and an angular application. The object px.dealer allows a card to use a hypertext transfer protocol service to retrieve data.

Example of Display Cards in a Deck

In one example embodiment, a component can be created that utilizes the view service to access all cards in a deck. The view service can be accessed, for example, via a URL.

Example Instances and Templates

Views, cards, and widgets may be created based on predefined templates which can be created and configured by users in advance. Upon instantiation, these templates are used as a base for the creation of views, cards, and widgets. A view object template is a preset configuration of a view object that can be reused so that the configuration does not have to be recreated each time it is used.

Figure 4B:
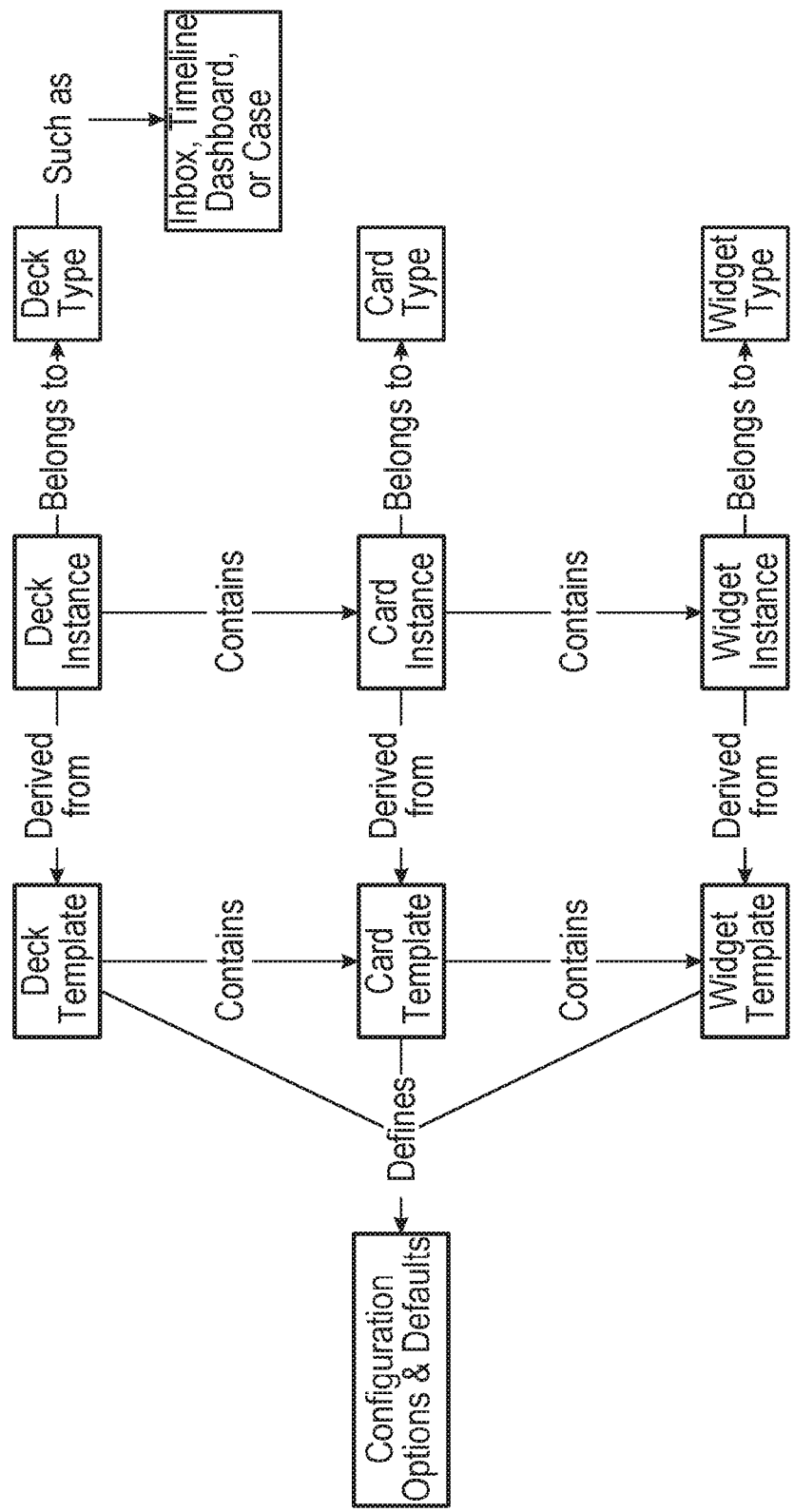
FIG. 4B is a conceptual diagram illustrating relationship between card, deck, and widget templates and instances, in accordance with an example embodiment.

FIG. 4B is a conceptual diagram illustrating relationships between card, deck, and widget templates and instances, in accordance with an example embodiment. Configuration Options and Defaults defines a deck template, a card template, and a widget template. A deck instance is derived from the deck template, a card instance is derived from the card template, and a widget instance is derived from the widget template. A deck instance has a deck type (such as inbox, timeline, dashboard, or case), a card instance has a card type, and a widget instance has a widget type.

Figure 4C:
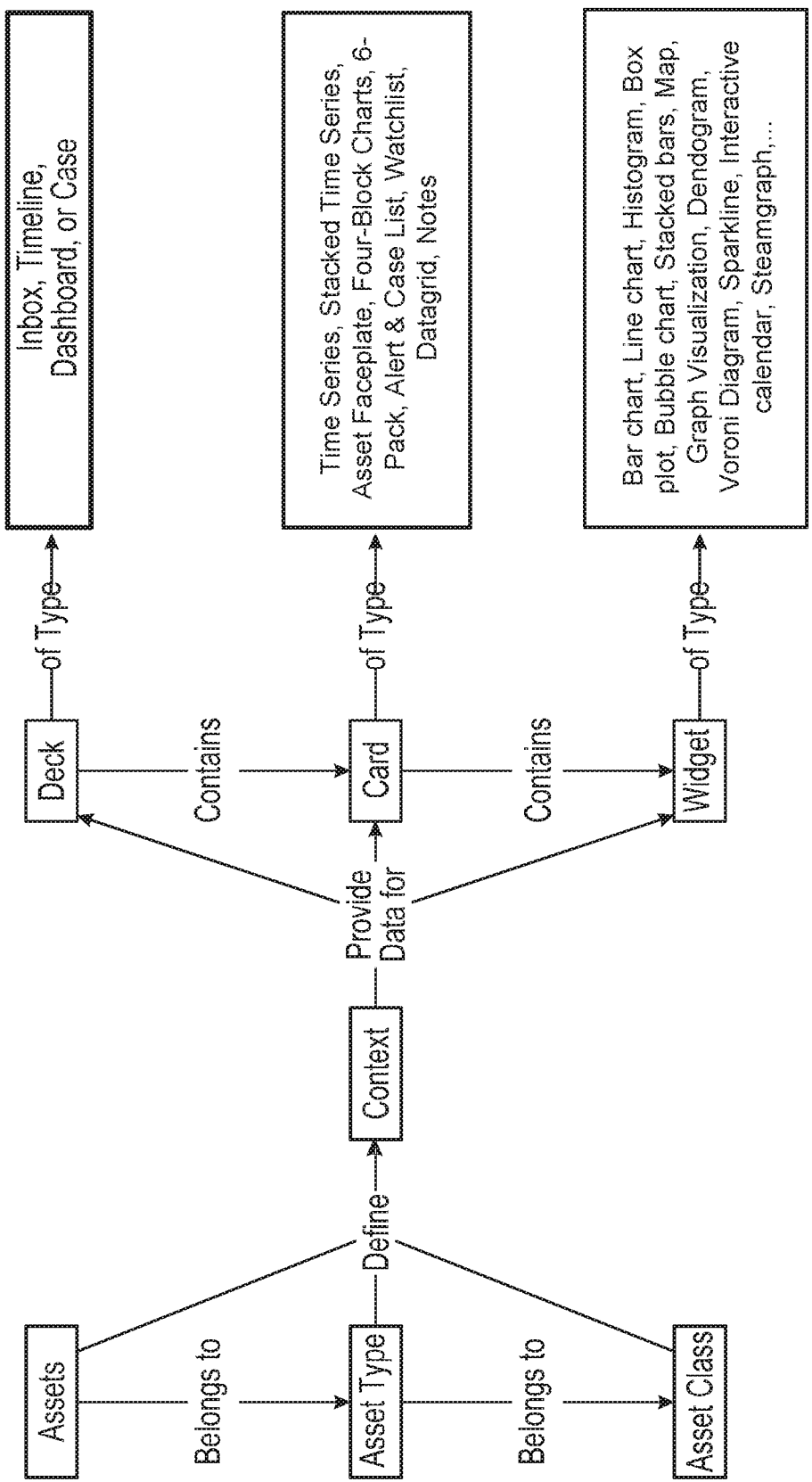
FIG. 4C is a map of concept types and relations, in accordance with an example embodiment.

FIG. 4C is a map of concept types and relations, in accordance with an example embodiment. As illustrated, the assets object belongs to asset type, and asset type belongs to the asset class. The assets, asset type, and asset class define the context object, which provides data for the instances of decks, cards, and widgets. Each deck, card, and widget has a corresponding type. FIG. 4C identifies example types of decks, cards, and widgets.

Example of Customizing a Web Application

Figure 5A:
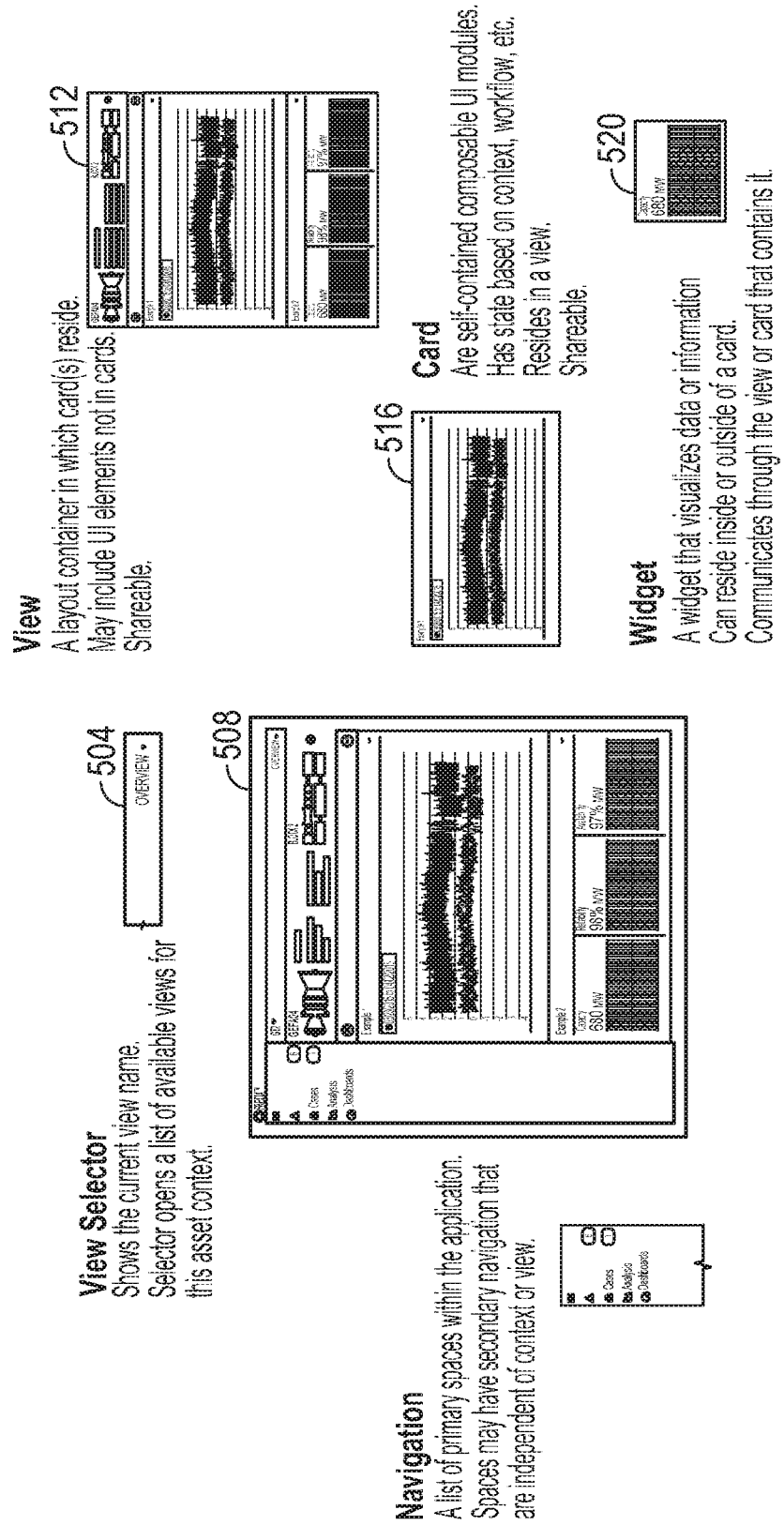
FIG. 5A illustrates the components of an example application, in accordance with an example embodiment.

FIG. 5A illustrates the components of an example application 114, in accordance with an example embodiment. As described above, a view is a layout container in which cards reside. The view may also include user interface elements not in the cards. As described above, cards are self-contained, composable user interface modules that have state. Widgets visualize data and can reside inside or outside a card.

In one example embodiment, a view selector 504 enables a user to enter or select a view by view name. The displayed view 508, 512 displays the selected view and comprises a displayed card 516 and a displayed widget 520.

Figure 5B:
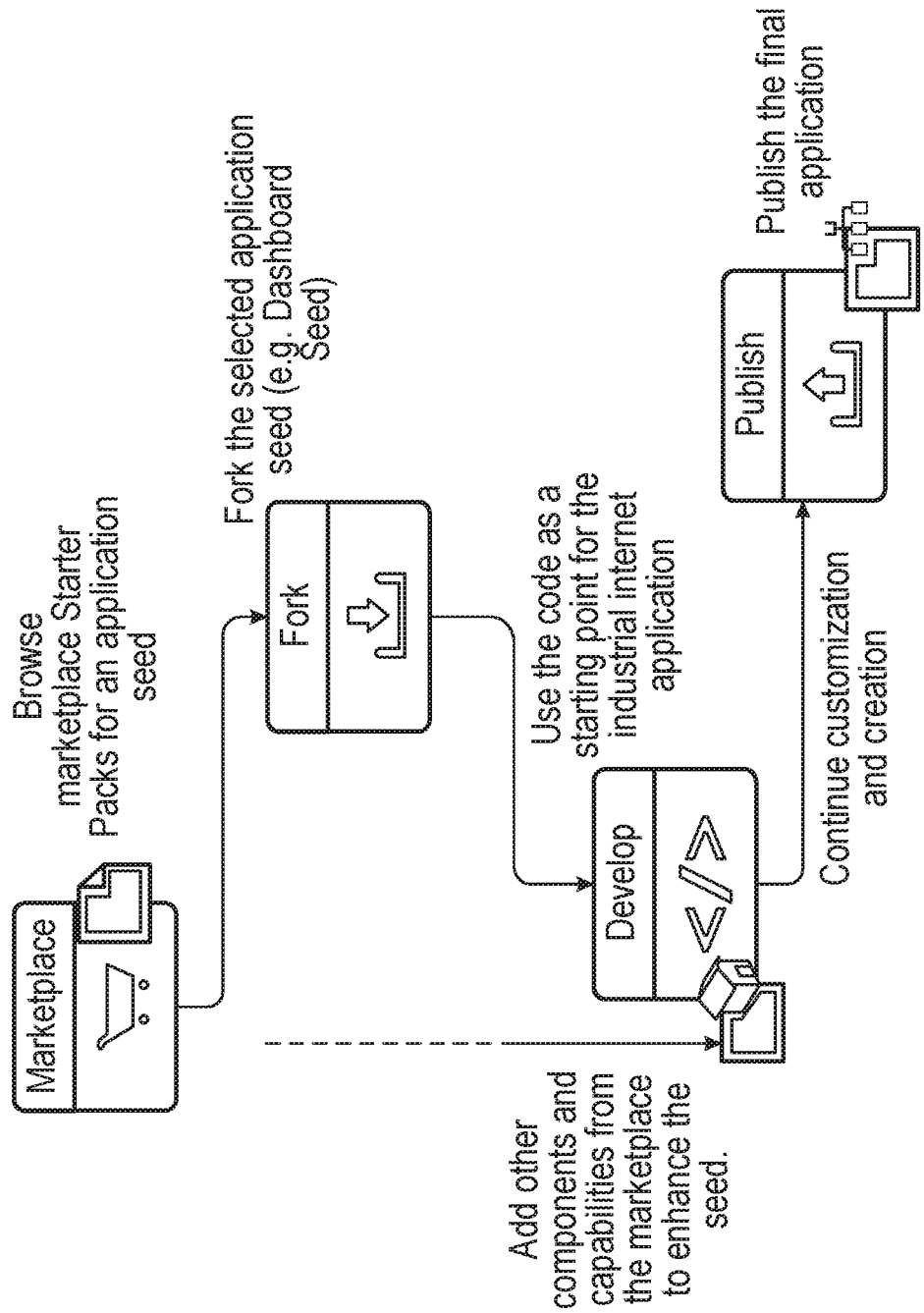
FIG. 5B illustrates an example workflow for developing an application, in accordance with an example embodiment.
Figure 6:
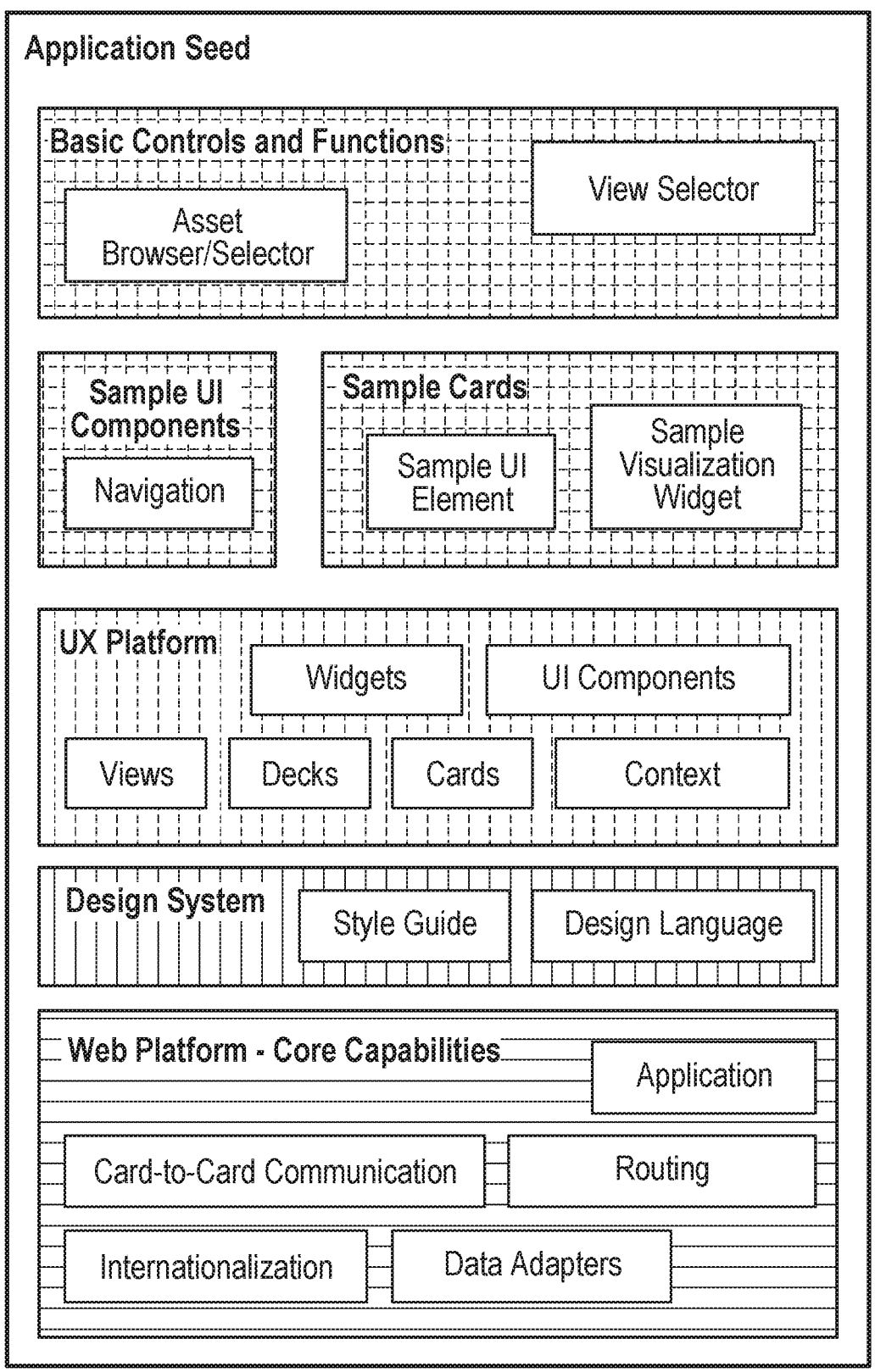
FIG. 6 illustrates various seed features and functions for developing an application, in accordance with an example embodiment.
Figure 7:
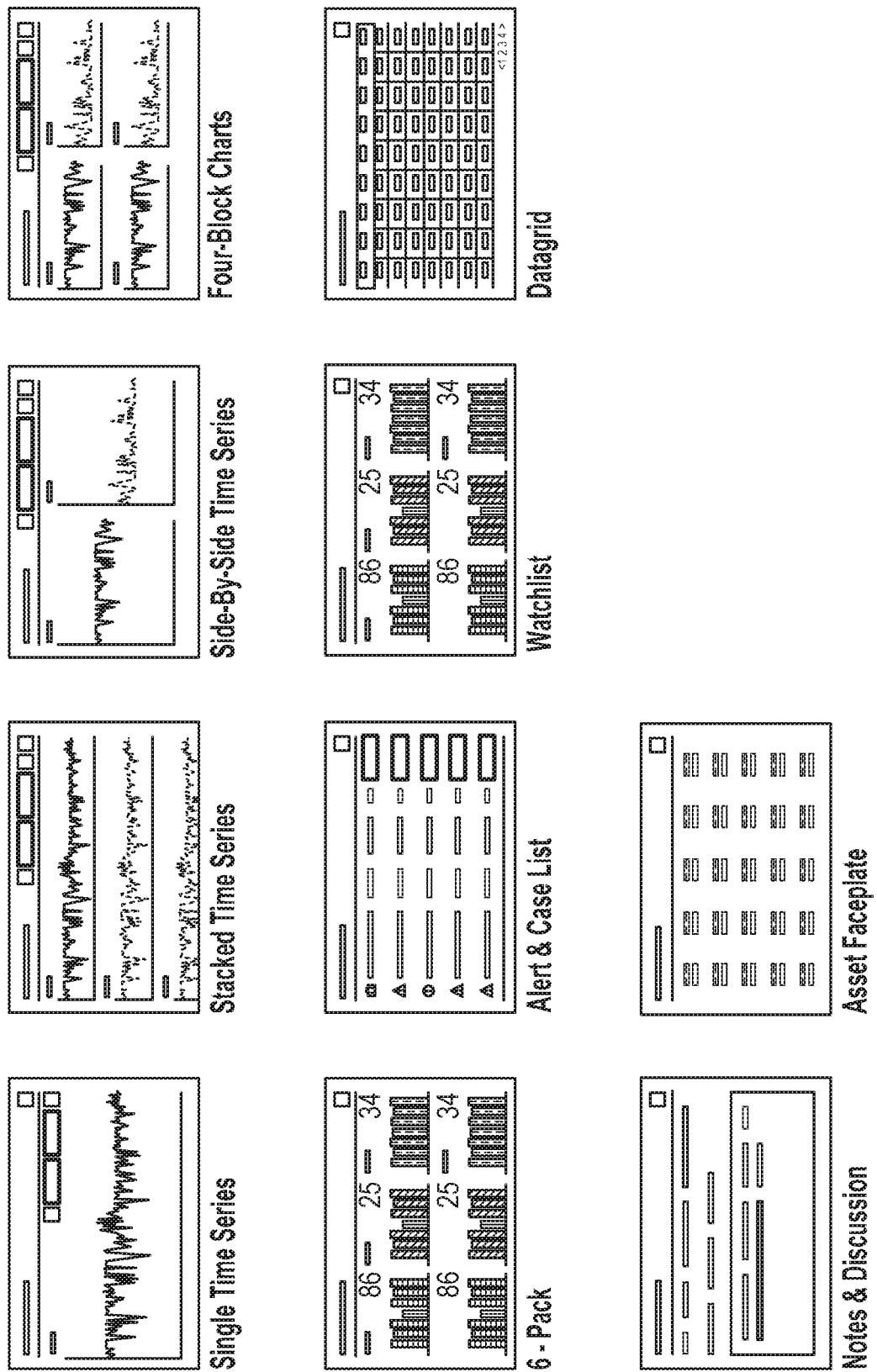
FIG. 7 illustrates examples of card templates, in accordance with an example embodiment.

FIG. 5B illustrates an example workflow for developing an application 114, in accordance with an example embodiment. Seed applications provide a basic level of code that can be used as a starting point of an application 114, such as an industrial internet application. FIG. 6 illustrates various seed features and functions for developing an application 114, in accordance with an example embodiment. FIG. 7 illustrates examples of card templates, in accordance with an example embodiment.

A design system provides the framework, core tools, and components to customize a web application. Interactions can be enabled between components, widgets, and user interface elements within an individual card; interactions with other cards can also be enabled. A deck can be used for simple one-dimensional layout control of cards, as well as to create more intricate user interactions.

A web application can be customized using the APIs of the view service based on the following steps:

1. Create a card in the view service database that can be retrieved in JSON format (see Creating a Card).
2. Create a deck in the view service database that can be retrieved in JSON format (see Creating a Deck).
3. Associate one or more cards to a deck and retrieve all cards (see Associating a Card with a Deck).
4. Tag a card or deck to enable look up by category (see Tagging a Deck).
5. Query data with filters (see Query Data with Filters).
6. Display the cards in a deck (see Display Cards in a Deck).

A web application can be customized using the APIs of the view service based on the following JSON code:

```
<!-- web component to add to the page -->
<px-dashboard view-service-base-url="/api/view-service" selected-deck-
id="1"></px- dashboard>
<!-- Web component will read the json, convert into dom element, and
inject into the document -->
<px-dashboard selected-deck="/api/decks/1?filter[include][cards]">
<container>
<px-deck id="deck-1">
<my-temperature-card id="card-1" title="San Ramon
    Temperature"postal="94582" unit="F"></my-temperature-card>
<my-temperature-card id="card-3" title="Walnut Creek Temperature"
    postal="94595" unit="F"></my-temperature-card>
</px-deck>
</container>
</px-dashboard>
```

The following is an example of a view service response:

```
<!-- web component to add to the page -->
<px-dashboard view-service-base-url="/api/view-service" selected-deck-
id="1"></px- dashboard>
<!-- Web component will read the json, convert into dom element, and
inject into the document -->
<px-dashboard selected-deck="/api/decks/1?filter[include][cards]">
<container>
<px-deck id="deck-1">
<my-temperature-card id="card-1" title="San Ramon
    Temperature"postal="94582" unit="F"></my-temperature-card>
<my-temperature-card id="card-3" title="Walnut Creek Temperature"
    postal="94595" unit="F"></my-temperature-card>
</px-deck>
</container>
</px-dashboard>
```

The following is an example of a view service response:

```
{
    "id": "1",
    "title": "Overview",
    "slug": "px-deck",
    "cardOrder": null,
    "createTimeStamp": "2015-11-24T23:02:53.838Z",
    "tags": [{
        "id": "1",
        "value": "parent"
    }],
    "cards": [{
        "id": "2",
        "title": "widgets card",
        "slug": "widgets-card",
        "attributes": { },
        "createTimeStamp": "2015-11-
            24T23:02:53.816Z",
        "tags": [ ]
    }, {
        "id": "3",
        "title": "gist card",
        "slug": "gist-card",
        "attributes": { },
        "createTimeStamp": "2015-11-
            24T23:02:53.816Z",
        "tags": [ ]
    }]
}
```

A Dashboard Starter Pack is a framework for enhancing the features and functions of a seed to create a dashboard application. The Dashboard Starter Pack provides the following capabilities:

Cloud Foundry deployment support.
Contextual Dashboard
Cards
Decks
Data binding
Time Series chart Vertical navigation Contextual browser A dashboard application can be created in the following ways:

Enhance the seed with additional components and capabilities for a basic dashboard application Fork the seed as a starting point to create a custom version with services and tools available in the catalog Modules, Components, and Logic Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application 114 or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an application specific integrated circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications, and so forth described in conjunction with FIGS. 1-9 are implemented, in some embodiments, in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

Software Architecture

Figure 8:
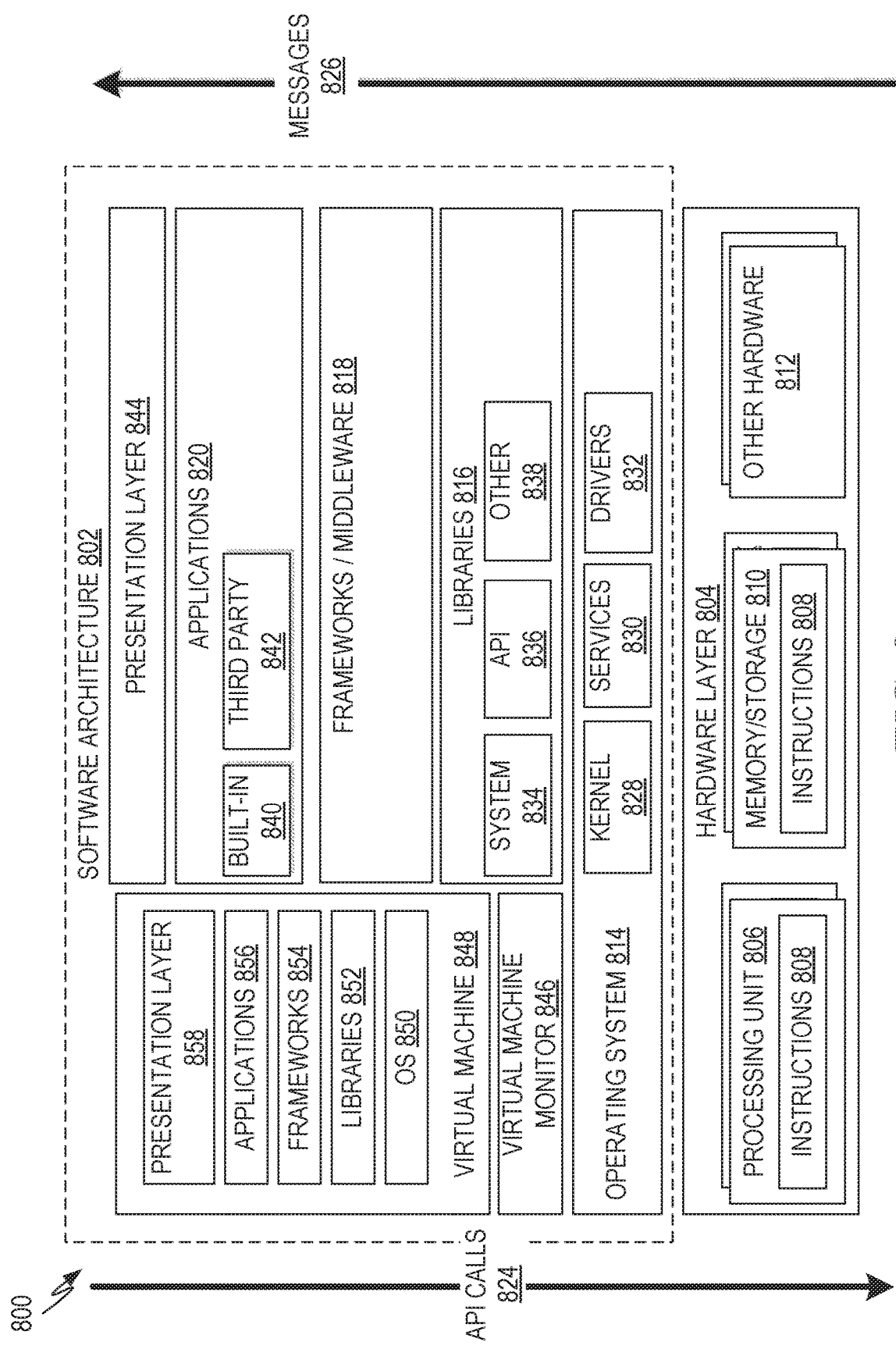
FIG. 8 is a block diagram illustrating a representative software architecture which may be used in conjunction with various hardware architectures herein described.

FIG. 8 is a block diagram 800 illustrating a representative software architecture 802, which may be used in conjunction with various hardware architectures herein described. FIG. 8 is merely a non-limiting example of a software architecture 802, and it will be appreciated that many other architectures may be implemented to facilitate the functionality described herein. The software architecture 802 may be executing on hardware such as a machine 900 of FIG. 9 that includes, among other things, processors 910, memory/storage 930, and I/O components 950. A representative hardware layer 804 is illustrated and can represent, for example, the machine 900 of FIG. 9. The representative hardware layer 804 comprises one or more processing units 806 having associated executable instructions 808. The executable instructions 808 represent the executable instructions of the software architecture 802, including implementation of the methods, modules, and so forth of FIGS. 1-7. The hardware layer 804 also includes memory and/or storage modules 810, which also have the executable instructions 808. The hardware layer 804 may also comprise other hardware 812, which represents any other hardware of the hardware layer 804, such as the other hardware illustrated as part of the machine 900.

In the example architecture of FIG. 8, the software architecture 802 may be conceptualized as a stack of layers where each layer provides particular functionality. For example, the software architecture 802 may include layers such as an operating system 814, libraries 816, frameworks/middleware 818, applications 820, and a presentation layer 844. Operationally, the applications 820 and/or other components within the layers may invoke API calls 824 through the software stack and receive a response, returned values, and so forth illustrated as messages 826 in response to the API calls 824. The layers illustrated are representative in nature, and not all software architectures have all layers. For example, some mobile or special purpose operating systems 814 may not provide a frameworks/middleware 818, while others may provide such a layer. Other software architectures may include additional or different layers.

The operating system 814 may manage hardware resources and provide common services. The operating system 814 may include, for example, a kernel 828, services 830, and drivers 832. The kernel 828 may act as an abstraction layer between the hardware and the other software layers. For example, the kernel 828 may be responsible for memory management, processor management (e.g., scheduling), component management, networking, security settings, and so on. The services 830 may provide other common services for the other software layers. The drivers 832 may be responsible for controlling or interfacing with the underlying hardware. For instance, the drivers 832 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 816 may provide a common infrastructure that may be utilized by the applications 820 and/or other components and/or layers. The libraries 816 typically provide functionality that allows other software modules to perform tasks in an easier fashion than to interface directly with the underlying operating system 814 functionality (e.g., kernel 828, services 830, and/or drivers 832). The libraries 816 may include system libraries 834 (e.g., C standard library) that may provide functions such as memory allocation functions, string manipulation functions, mathematic functions, and the like. In addition, the libraries 816 may include API libraries 836 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D in a graphic context on a display), database libraries (e.g., SQLite that may provide various relational database functions), web libraries (e.g., WebKit that may provide web browsing functionality), and the like. The libraries 816 may also include a wide variety of other libraries 838 to provide many other APIs to the applications 820 and other software components/modules.

The frameworks/middleware 818 may provide a higher-level common infrastructure that may be utilized by the applications 820 and/or other software components/modules. For example, the frameworks/middleware 818 may provide various graphic user interface (GUI) functions, high-level resource management, high-level location services, and so forth. The frameworks/middleware 818 may provide a broad spectrum of other APIs that may be utilized by the applications 820 and/or other software components/modules, some of which may be specific to a particular operating system or platform.

The applications 820 include built-in applications 840 and/or third-party applications 842. Examples of representative built-in applications 840 may include, but are not limited to, a contacts application, a browser application, a book reader application, a location application, a media application, a messaging application, and/or a game application. Third-party applications 842 may include any of the built-in applications 840 as well as a broad assortment of other applications. In a specific example, the third-party application 842 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 842 may invoke the API calls 824 provided by the mobile operating system such as the operating system 814 to facilitate functionality described herein.

The applications 820 may utilize built-in operating system functions (e.g., kernel 828, services 830, and/or drivers 832), libraries (e.g., system libraries 834, API libraries 836, and other libraries 838), and frameworks/middleware 818 to create user interfaces to interact with users of the system. Alternatively, or additionally, in some systems, interactions with a user may occur through a presentation layer, such as the presentation layer 844. In these systems, the application/module "logic" can be separated from the aspects of the application/module that interact with a user.

Some software architectures utilize virtual machines. In the example of FIG. 8, this is illustrated by a virtual machine 848. A virtual machine creates a software environment where applications/modules can execute as if they were executing on a hardware machine (such as the machine 900 of FIG. 9, for example). The virtual machine 848 is hosted by a host operating system (operating system 814 in FIG. 8) and typically, although not always, has a virtual machine monitor 846, which manages the operation of the virtual machine 848 as well as the interface with the host operating system (i.e., operating system 814). A software architecture executes within the virtual machine 848, such as an operating system 850, libraries 852, frameworks/middleware 854, applications 856, and/or a presentation layer 858. These layers of software architecture executing within the virtual machine 848 can be the same as corresponding layers previously described or may be different.

Example Machine Architecture and Machine-Readable Medium

Figure 9:
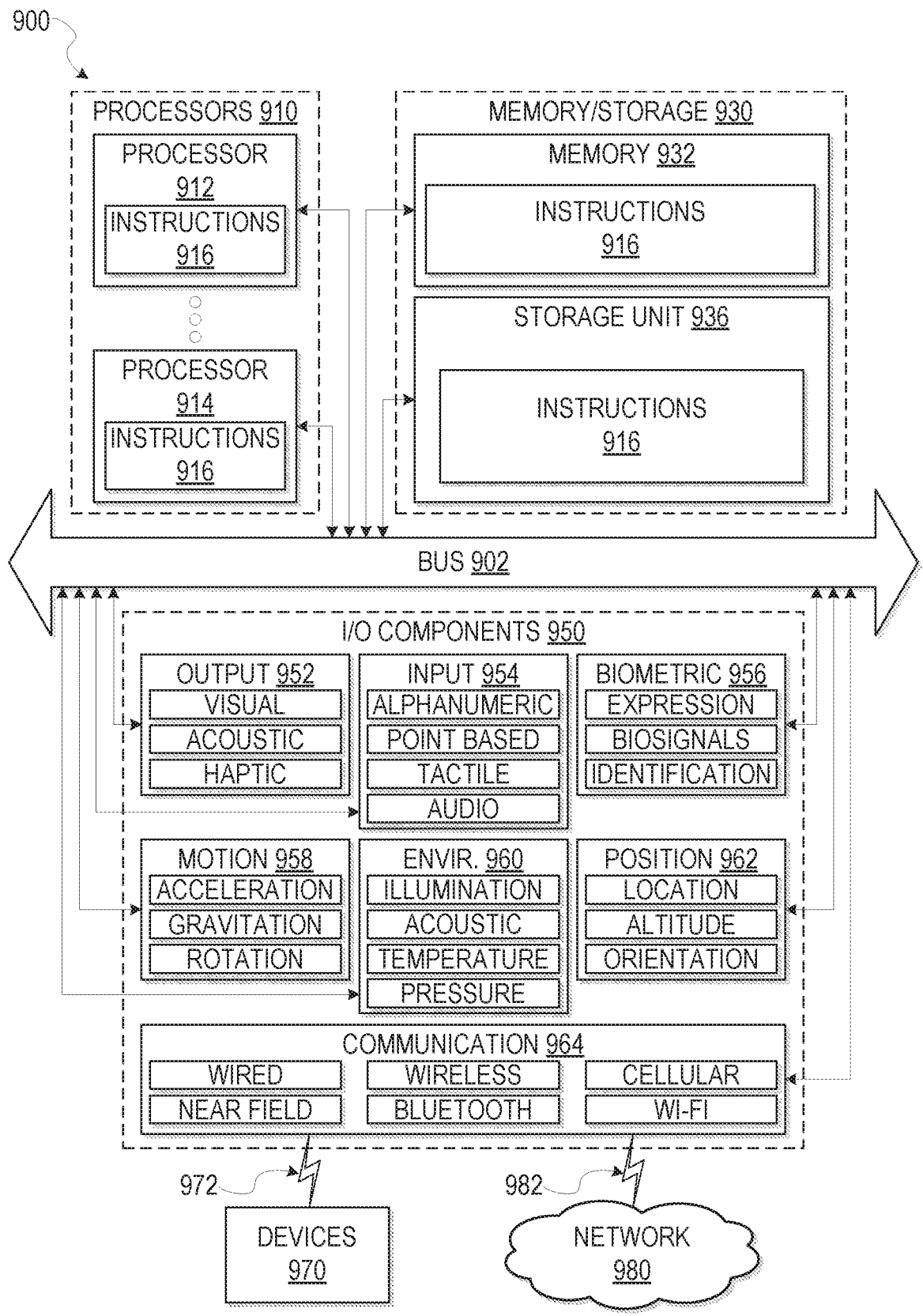
FIG. 9 is a block diagram illustrating components of a machine, according to some example embodiments, able to read instructions from a machine-readable medium (e.g., a machine-readable storage medium) and perform any one or more of the methodologies discussed herein.

FIG. 9 is a block diagram illustrating components of a machine 900, according to some example embodiments, able to read instructions 916 from a machine-readable medium (e.g., a machine-readable storage medium) and perform any one or more of the methodologies discussed herein. Specifically, FIG. 9 shows a diagrammatic representation of the machine 900 in the example form of a computer system, within which the instructions 916 (e.g., software, a program, an application, an applet, an app, or other executable code) for causing the machine 900 to perform any one or more of the methodologies discussed herein may be executed. For example, the instructions 916 may cause the machine 900 to execute the flow diagram of FIGS. 2-3. Additionally, or alternatively, the instructions 916 may implement modules of FIG. 1, and so forth. The instructions 916 transform the general, non-programmed machine 900 into a particular machine programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory/storage 930, and I/O components 950, which may be configured to communicate with each other such as via a bus 902. In an example embodiment, the processors 910 (e.g., a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), another processor, or any suitable combination thereof) may include, for example, a processor 912 and a processor 914 that may execute the instructions 916. The term "processor" is intended to include a multi-core processor 912, 914 that may comprise two or more independent processors 912, 914 (sometimes referred to as "cores") that may execute the instructions 916 contemporaneously. Although FIG. 9 shows multiple processors 910, the machine 900 may include a single processor 912, 914 with a single core, a single processor 912, 914 with multiple cores (e.g., a multi-core processor 912, 914), multiple processors 912, 914 with a single core, multiple processors 912, 914 with multiples cores, or any combination thereof.

The memory/storage 930 may include a memory 932, such as a main memory, or other memory storage, and a storage unit 936, both accessible to the processors 910 such as via the bus 902. The storage unit 936 and memory 932 store the instructions 916 embodying any one or more of the methodologies or functions described herein. The instructions 916 may also reside, completely or partially, within the memory 932, within the storage unit 936, within at least one of the processors 910 (e.g., within the cache memory of processor 912, 914), or any suitable combination thereof, during execution thereof by the machine 900. Accordingly, the memory 932, the storage unit 936, and the memory of the processors 910 are examples of machine-readable media.

As used herein, "machine-readable medium" means a device able to store the instructions 916 and data temporarily or permanently and may include, but not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store the instructions 916. The term "machine-readable medium" shall also be taken to include any medium, or combination of multiple media, that is capable of storing instructions (e.g., instructions 916) for execution by a machine (e.g., machine 900), such that the instructions 916, when executed by one or more processors of the machine 900 (e.g., processors 910), cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 950 may include a wide variety of components to receive input, provide output, produce output, transmit information, exchange information, capture measurements, and so on. The specific I/O components 950 that are included in a particular machine 900 will depend on the type of machine 900. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion, and the grouping is in no way limiting. In various example embodiments, the I/O components 950 may include output components 952 and input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 950 may include biometric components 956, motion components 958, environmental components 960, or position components 962, among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 962 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 970 via a coupling 982 and a coupling 972 respectively. For example, the communication components 964 may include a network interface component or other suitable device to interface with the network 980. In further examples, the communication components 964 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., a peripheral device coupled via a USB).

Moreover, the communication components 964 may detect identifiers or include components operable to detect identifiers. For example, the communication components 964 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix. Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 964, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 980 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., hypertext transfer protocol (HTTP)). Similarly, the instructions 916 may be transmitted or received using a transmission medium via the coupling 972 (e.g., a peer-to-peer coupling) to the devices 970. The term "transmission medium" shall be taken to include any intangible medium that is capable of storing, encoding, or carrying the instructions 916 for execution by the machine 900, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   obtaining, using one or more hardware processors, sensor data from an industrial asset being monitored and context information of the industrial asset being monitored;
   querying, using the one or more hardware processors, a database based on a contextual tag table comprising a plurality of contextual identifiers in tabular format including a category value and a tenant identifier, wherein a context of a system is defined in a context object, the querying is performed by comparing the context information to the context object, and the querying comprises identifying a plurality of composable user interface objects that are tagged with a contextual identifier in the contextual tag table and which display a type of the sensor data obtained from the industrial asset and identifying a container that is tagged with the contextual identifier in the contextual tag table and which comprises a visual layout for the plurality of composable user interface objects; and
   displaying a user interface comprising the plurality of identified composable user interface objects displaying the sensor data embedded therein within the visual layout of the identified container.

2. The method of claim 1, wherein the visual layout of the container determines an arrangement of the plurality of the composable user interface objects in the container.

3. The method of claim 1, wherein the plurality of composable user interface objects correspond to a defined content area of a display screen.

4. The method of claim 1, further comprising displaying sensor data embedded in one or more of the plurality of composable user interface objects in a corresponding view in which the one or more composable user interface objects reside.

5. The method of claim 4, further comprising creating the view using a view service, the view service creating a state associated with the view for displaying the sensor data contained in the one or more composable user interface objects.

6. The method of claim 5, further comprising creating a composable user interface object from a template and storing the created composable user interface object in a database of the view service.

7. The method of claim 1, further comprising indexing the plurality of composable user interface objects based on context.

8. The method of claim 1, wherein the plurality of composable user interface objects enable interactions between components therein and components of other composable user interface objects.

9. An apparatus comprising:
   a processor;
   memory to store instructions that, when executed by the processor cause the processor to perform operations comprising:
      obtaining, using one or more hardware processors, sensor data from an industrial asset and context information of the industrial asset being monitored;
      querying, using the one or more hardware processors, a database based on a contextual tag table comprising a plurality of contextual identifiers in tabular format including a category value and a tenant identifier, wherein a context of a system is defined in a context object, the querying is performed by comparing the context information to the context object, and the querying comprises identifying a plurality of composable user interface objects that are tagged with a contextual identifier in the contextual tag table and which display a type of the sensor data obtained from the industrial asset, and identifying a container that is tagged with the contextual identifier in the contextual tag table and which comprises a visual layout for the plurality of composable user interface objects; and
      displaying a user interface comprising the plurality of composable user interface objects displaying the sensor data embedded therein within the visual layout of the identified container.

10. The apparatus of claim 9, wherein the visual layout of the container a determines an arrangement of the plurality of the composable user interface objects in the container.

11. The apparatus of claim 9, wherein the plurality of composable user interface objects correspond to a defined content area of a display screen.

12. The apparatus of claim 9, the operations further comprising displaying sensor data contained in the plurality of composable user interface objects in a corresponding view, the view being a layout container in which the plurality of composable user interface objects reside.

13. The apparatus of claim 12, the operations further comprising creating the view using a view service, the view service creating a state associated with the view for displaying the sensor data contained in the plurality of composable user interface objects.

14. The apparatus of claim 13, the operations further comprising creating a composable user interface module from a template and storing the created composable user interface module in a database of the view service.

15. A non-transitory machine-readable storage medium comprising instructions that, when executed by one or more processors of a machine, cause the machine to perform operations comprising:
obtaining, using one or more hardware processors, sensor data from an industrial asset and context information of the industrial asset being monitored;
querying, using the one or more hardware processors, a database based on a contextual tag table comprising a plurality of contextual identifiers in tabular format including a category value and a tenant identifier, wherein a context of a system is defined in a context object, the querying is performed by comparing the context information to the context object, and the querying comprises identifying a plurality of composable user interface objects that are tagged with a contextual identifier in the contextual tag table and which display a type of the sensor data obtained from the industrial asset, and identifying a container that is tagged with the contextual identifier in the contextual tag table and which comprises a visual layout for the plurality of composable user interface objects; and
displaying a user interface comprising the plurality of composable user interface objects displaying the sensor data embedded therein within the visual layout of the identified container.

* * * * *